Figure 1:
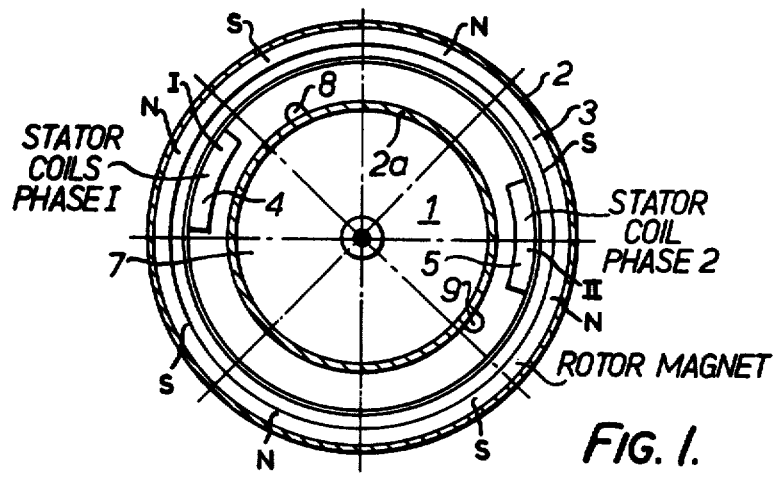

United States Patent [19]

Wren et al.

[11] 4,096,419
[45] Jun. 20, 1978

[54] ELECTRIC MOTORS

[75] Inventors: John Pelham Wren; Michael Keith Steventon, both of Swindon, England

[73] Assignee: Plessey Handel Und Investments AG., Zug, Switzerland

[21] Appl. No.: 722,269

[22] Filed: Sep. 10, 1976

[30] Foreign Application Priority Data

Sep. 12, 1975 United Kingdom ............. 37506/75
Sep. 23, 1975 United Kingdom ............. 38898/75

[51] Int. Cl.² .......................................... H02K 29/00
[52] U.S. Cl. .................................. 318/138; 318/254
[58] Field of Search ............. 318/138, 254, 685, 696, 318/171

[56] References Cited

U.S. PATENT DOCUMENTS 3,383,574  5/1968  Manteuffel ............................. 318/254
3,912,283  10/1975  Hammond et al. ..................... 318/138

Primary Examiner—Herman J. Hohauser
Attorney, Agent, or Firm—Fleit & Jacobson

[57] ABSTRACT

A motor arranged directly to drive a gramophone turntable which comprises a number of permanent magnet rotor pole pairs arranged on the circumference of a circle centered at the motor shaft, a number of air cored stator windings there being less stator windings than rotor pole pairs, and a commutator arrangement for controlling current through the windings whereby they react with the rotor poles to produce rotation of the turntable the current being controlled so that torque ripple is obviated.

13 Claims, 11 Drawing Figures

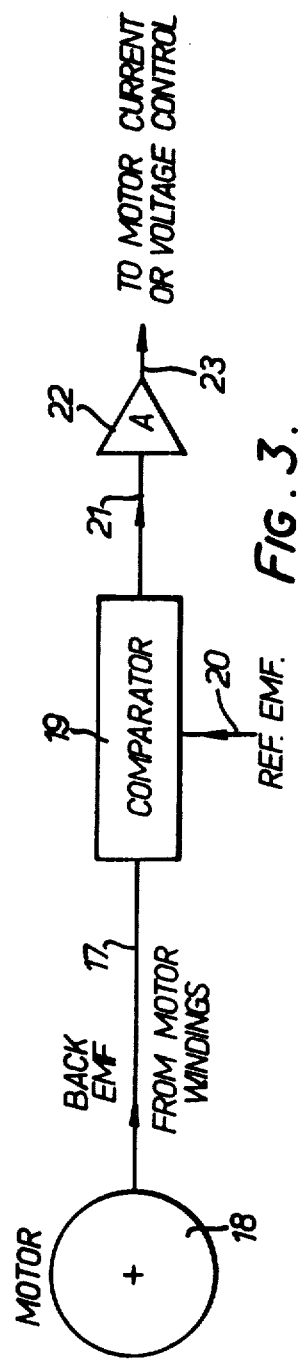
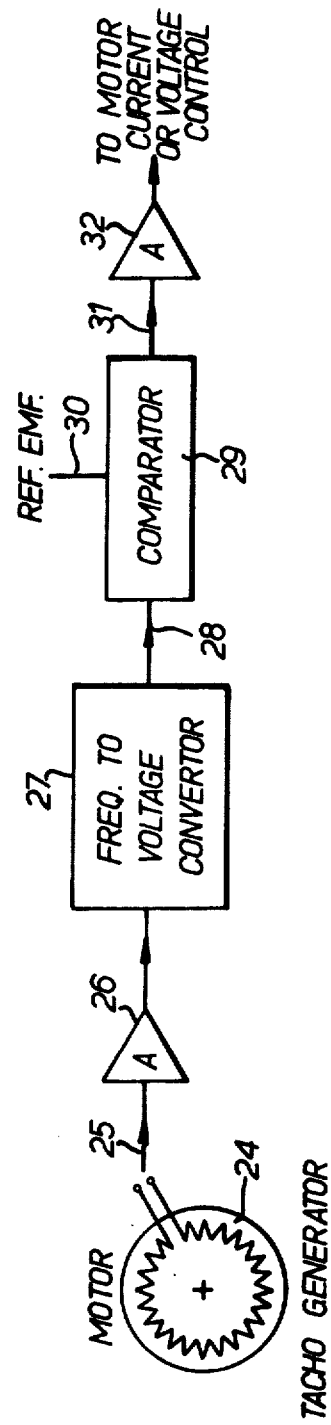
FIG. 3.
FIG. 4.

ELECTRIC MOTORS

This invention relates to motor arrangements, and more especially but not exclusively it relates to gramophone motor arrangements.

According to the present invention a motor arrangement comprises a rotor having an even number of permanent magnet rotor poles arranged on the circumference of a circle centred at the motor shaft, and a stator having one or more air cored stator windings per phase there being less stator windings per phase than rotor pole pairs, and commutator means for controlling current fed to the said windings whereby they react with the rotor poles to produce rotation of the rotor and whereby the sum, for all phases, of the product of magnetic flux and current at any angular position of the motor shaft is substantially constant thereby to provide substantially constant torque at the motor shaft.

Although the motor may have up to four stator winding phases a motor having two stator winding phases will have a rotor constructed and arranged to provide a sinusoidal magnetic flux variation with angular motor shaft position, the commutator means providing current waveforms for the two stator winding phases having sine and cosine characteristics respectively, the arrangement being such that the current waveform completes one sinusoidal half cycle consequent upon rotation of the rotor one rotor pole pitch.

Thus since torque is proportional to the product of flux and current and since both of these vary sinusoidally with angular rotor position, the torque experienced by the rotor is the sum of torque due to each phase which is therefore proportional to $\sin^2\theta + \cos^2\theta$ which is a constant, where $\theta$ is the angular rotor position.

When other phase arrangements are used, the waveforms applied and the flux associated with the rotor poles are suitably modified so that for all angular positions the sum for all phases of the product of flux and current at any angular rotor position is constant.

The stator and rotor may be mutually opposed so as to define therebetween a cylindrical air gap.

The motor may be arranged to drive directly tape apparatus, video playback apparatus or record playing apparatus.

The rotor of the motor may form part of a gramophone turntable to which are attached an even number of permanent magnet rotor poles arranged on the circumference of a circle which is concentric with the circumference of the turntable. The stator windings may be positioned relative to the stator poles so as to define therebetween a cylindrical air gap and the rotor poles may be profiled to provide a sinusoidal flux gradient from pole to pole.

By providing less stator windings per phase than rotor pole pairs it is apparent that a manufacturing economy results. However by, in effect, leaving out some of the stator windings, so that at any instant not all of the rotor poles are disposed so as to react with the field produced by an opposed stator winding, a loss of torque results but in many applications this can be compensated for by utilising a larger diameter rotor. A relatively large diameter rotor is of course afforded when the rotor is arranged to form a part of a gramophone turntable.

The windings may be so angularly spaced relative to the angular spacing of the rotor poles as to define a two phase motor having one winding per phase. Alternatively two windings per phase may be provided wherein the windings of each phase are positioned diametrically opposite each other.

The stator windings in this latter arrangement are connected so as to react diametrically in opposition whereby radial forces which could cause vibration are substantially balanced. One way of achieving this balance is to arrange that the windings of each phase are connected so as to have similar magnetic characteristics when energized, the windings being arranged to react with diametrically opposed rotor pole pairs wherein the poles of each pair have the same polarity.

The stator winding may be arranged to project within the rotor poles which are carried on a rim part of the turntable the rim being of generally cylindrical configuration and arranged beneath the turntable and concentric with the turntable.

The rim may be fabricated from soft magnetic material. The rim may be defined by and formed from one edge of the turntable the rotor poles being supported on the inside surface of the rim.

The rotor poles may be imprinted in a plastics magnetic material which is formed to define a generally cylindrical band and secured to the inside surface of the rim. In order to improve the efficiency of magnetic circuit two concentric rims may be provided one of which carries the rotor poles and both being fabricated of soft magnetic material with the stator windings being arranged to project into the space between the two rims.

The air cored stator windings may be supported on a cylindrical wall of material which may form the side wall of a cup-like structure mounted beneath the turntable. The turntable may conveniently be journalled in a hydrodynamic bearing.

The commutator means may comprise Hall effect devices which may be positioned to react with and be switched by the magnetic poles of the rotor, or alternatively an additional magnet may be secured to the turntable to operate the Hall effect devices.

As an alternative to commutation utilising Hall effect devices, an opto electrical arrangement may be provided wherein shutter means or an optically graded disc or filter connected to the turntable is arranged to interrupt light normally incident on a photodetector or photodetectors whereby the photo detector or photo detectors provide an output signal utilised for commutation. The disc may be optically graded to provide sine and cosine function signals from two photo detectors spaced apart and receiving light through the disc. The sine and cosine function signals can then be used to control current fed to each phase of a two phase motor, sine for one phase and cosine for the other phase. Each detector may comprise two photo detector elements connected in antiphase so that differences in constant state effects are cancelled, together with resulting distortion.

Alternatively the commutator may be a conventional brush wiper type or in another embodiment the commutation may be effected by means of a reed relay or relays switched by magnets rotating with the turntable which may be the magnets defining the rotor poles or alternatively additional magnets.

In order to effect speed control, a feedback voltage may be produced and fed to a comparator for comparison with a reference voltage to provide a difference voltage which is utilised for speed control purposes. Feedback from the motor may be produced from back e.m.f. produced in the motor windings or alternatively a tacho generator may be provided which is secured to the motor to provide an a.c. output which is fed to the comparator for comparison with a reference and utilised to produce an error signal for motor control purposes. The tacho generator may comprise an optical arrangement as described in our G.B. patent application No. 35859/76. The voltage from the tacho may be an a.c. voltage which is compared digitally with a digital reference frequency such as an a.c. signal, or alternatively the voltage from the tacho may be a d.c. voltage or a rectified a.c. voltage which is fed to the comparator and compared with a d.c. reference level to provide an error signal which is utilised to control the motor speed. It will be appreciated that by selecting various reference levels fed to the comparator various speeds may be selected. The speed control may be efffected by means of a phase lock servo system using a shift register or gate type of phase detector. The speed reference in this case may be an R.C. oscillator of quartz crystal or a surface wave filter device. The speed controls and other controls may be of the electronic conductive touch type and the speed may be displayed on a digital indicator.

Figure 2A:
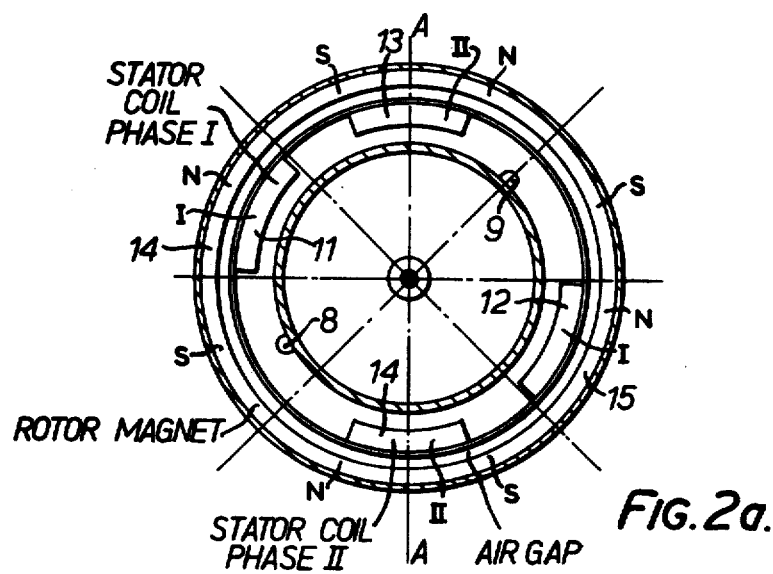
Figure 2B:
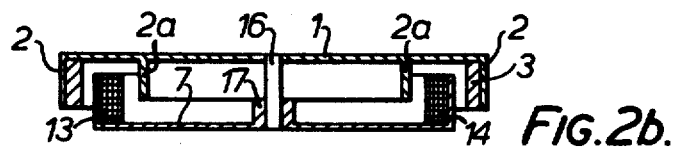
Figure 5:
Figure 6A:
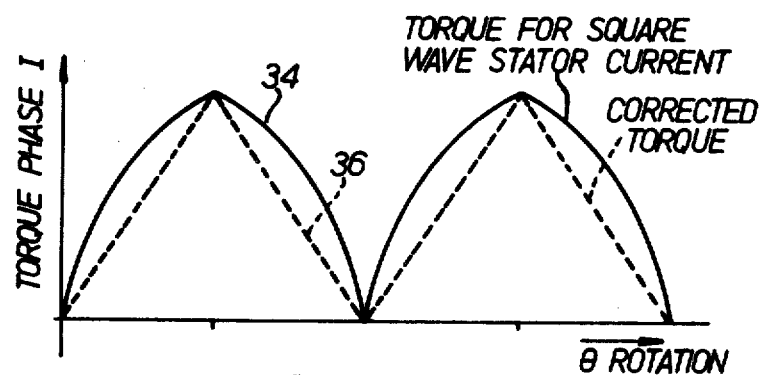
Figure 6B:
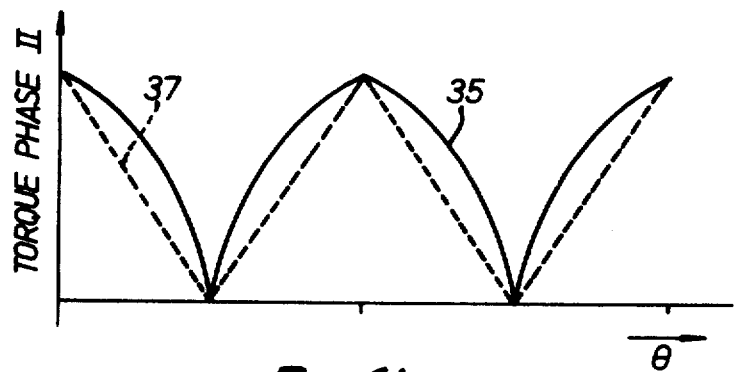
Figure 6C:
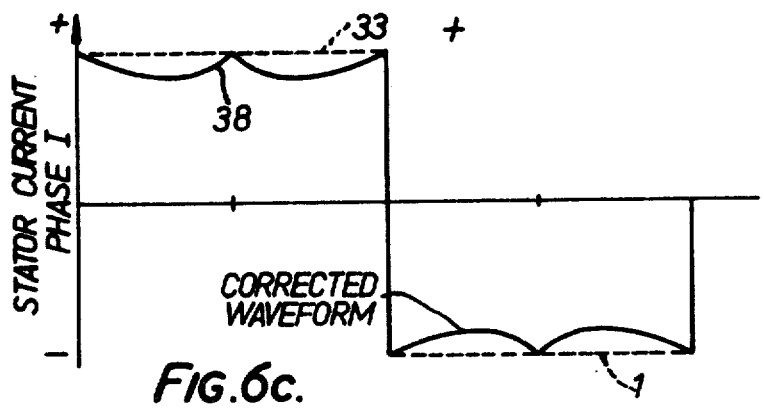
Figure 7:
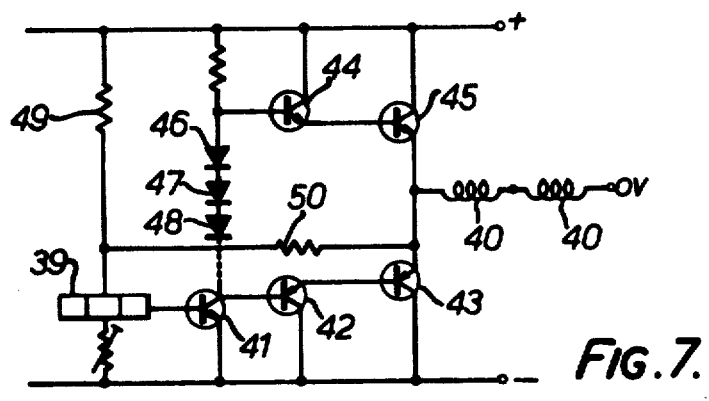
Figure 8:
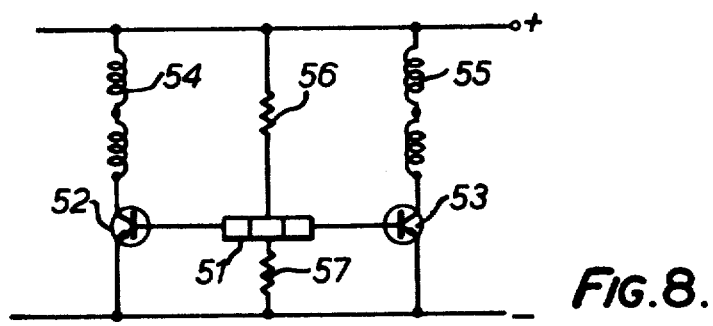

An exemplary embodiment of the invention will now be described with reference to the accompanying drawings in which:

FIG. 1 is a plan view of a gramophone turntable including a direct drive motor,

FIG. 2a is a plan view of a motor similar to the motor shown in FIG. 1 but having two phases and two stator windings per phase, FIG. 2b is a sectional side view along the line A—A of the motor shown in FIG. 2a, FIG. 3 is a generally schematic block diagram of part of a motor speed control system, FIG. 4 is a generally schematic block diagram showing an alternative speed control system, FIG. 5 is a developed view of part of the rotor shown in FIGS. 1, 2a and 2b, FIGS. 6a, 6b and 6c are waveform diagrams showing voltage-torque curves of a two phase motor, FIG. 7 is an arrangement showing a Hall effect switch for controlling current fed to the stator winding of a motor, and FIG. 8 is an alternative Hall effect switch arrangement for switching current through the stator coils of a motor.

Referring now to FIG. 1, a gramophone motor/turntable arrangement comprises a pressed steel turntable 1 having a cylindrical downwardly depending rim 2 to the inside edge of which a plastics strip of permanent magnet material 3 is fixed. The strip of permanent magnet material is impressed with four pairs of poles which are arranged to react with stator windings 4 and 5. A further rim 2a is provided in the present example to define an annular space between the rims 2 and 2a to improve magnetic efficiency, although the machine will operate with the rim 2 only. The stator windings 4 and 5 are fixed to the upstanding edge of a plastics cup 7 which is positioned beneath the turntable and arranged so that the upstanding edge projects into the annular space between the rims 2 and 2a. Thus a cylindrical air gap is produced between the magnetic strip 3 and the windings 4 and 5. In operation of the motor the windings 4 and 5 are fed respectively in phase quadrature as necessary in a two phase machine, and the stator windings are commutated as necessary by means of a pair of Hall effect devices 8 and 9 which are operatively associated with the windings 4 and 5 respectively so as to control the current fed thereto in a commutated mode. Hall effect devices are quite well known and operate to control the current fed to the coils as the magnetic poles of the rotor which are attached to the strip 3 pass the Hall effect devices.

By providing a stator assembly having air cored coils cogging effects are obviated since the rotor has no preferred angular position or positions of alignment. In order still further to reduce vibratory effects in operation or the motor, the motor torque is arranged to be constant. This is achieved by arranging that the strip of permanent magnet material 3 (FIG. 5) is provided with poles of the shape shown by the broken line 3a so that the flux varies sinusoidally from pole to pole around the rotor. Thus with Hall effect switching the stator current also varies sinusoidally. Therefore as hereinbefore described, a constant torque characteristic is produced and vibrating effects due to torque variations are obviated.

The strip of permanent magnet material may be magnetised so as to have magnetised parts defined as shown by the broken line 3a or it may be cut or profiled to produce this result.

As an alternative to the simple arrangement described with reference to FIG. 1, an arrangement may be provided as shown in FIGS. 2a and 2b wherein one phase has a pair of diametrically opposed windings 11 and 12 and the other phase has a pair of diametrically opposed windings 13 and 14. The windings 11 and 12 may be connected in series or parallel to have the same magnetic reaction with their associated poles 14 and 15 respectively so that the radial forces in the motor are balanced thereby reducing vibration. The turntable 1 is connected to a central spindle 16 which is journalled in a hydrodynamic bearing shown schematically at 17. Although a hydrodynamic bearing is used in the present embodiment, it is possible to use a conventional ball bearing or a flat oilite type bearing in alternative embodiments.

Although as shown in FIG. 1 and FIG. 2 Hall effect devices 8 and 9 have been used, it is quite possible to use alternative commutator arrangements such as a conventional brush commutator, an opto electrical commutator, or a reed relay switching arrangement connected to serve as a commutator and control the current as a sine or cosine function in the stator windings for two phase machines.

In order to control the speed of the motor, as shown in FIG. 3, a back e.m.f. may be sensed and an e.m.f. fed on line 17 from the motor winding shown schematically at 18 to a comparator 19 which is fed on line 20 with a reference voltage. In dependence upon the voltage differential between the reference voltage and the voltage on line 17, a control voltage is produced on line 21 which is passed via an amplifier 22 and an output line 23 to control the current fed to the motor field windings. Alternatively the signal on line 23 may be used to control the voltage fed to the field windings.

As shown in FIG. 4 an alternative speed control system may be used comprising a tacho generator 24 which produces an output signal on line 25 the frequency of which is proportional to the rate of rotation of the motor. This a.c. signal is fed via an amplifier 26 to a rectifier arrangement 27 and the resulting d.c. voltage level 28 is fed after smoothing to a comparator 29 to which a reference voltage is applied on line 30. An error voltage is produced on line 31 from the comparator in dependence upon the voltage difference on lines 28 and 30, the voltage on line 31 being fed via an amplifier 32 to control the voltage or current fed to the windings of the motor. The tacho generator may take any conventional form but one particularly convenient arrangement might comprise one or more reed relays which are sequentially operated by means of a magnet secured to the motor rotor thereby to produce a pulse output voltage the frequency of which is proportional to the rate of rotation of the motor.

It will be appreciated that in the foregoing arrangement the stator coils 4 and 5 in FIG. 1 and the coils 11, 12 and 13, 14 in FIG. 2 are air cored stators which are connected to a symmetrical rim which in the present embodiment is plastics but which may be of soft magnetic material. With this arrangement there is no preferred direction of orientation for the rotor since the stator coils are air cored and therefore there is no tendency for the turntable to cog during rotation. In addition to the absence of cogging resulting from the symmetrical rotor and stator arrangement, the absence of radial unbalanced forces produced by the opposing stator windings as shown in FIG. 2 produces a particularly suitable vibration-free motor assembly for use in high quality record reproducing apparatus. It will of course be appreciated that any convenient number of rotor poles may be used although in practice an even number between 6 and 18 might be chosen, and although several stator coils per phase may be chosen, consistent with there being less per phase than the number of rotor pole pairs, in the interests of economy, one or two coils per phase might normally be chosen.

Although sinusoidal characteristics may be imposed on the rotor pole flux and stator current, other arrangements are possible as will hereinafter be described.

Referring now to FIG. 6, in FIG. 6c there is shown a square waveform indicated by the broken line 33 which when applied to one phase of the stator winding of an electric motor having a permanent magnet rotor produces a torque characteristic indicated by the waveform 34 as shown in FIG. 6a. A square waveform corresponding to the waveform 33 but phase shifted with respect to waveform 33 by 90° (not shown) is fed to the other phase of the stator to produce a torque characteristic as shown in FIG. 6b and as indicated by the waveform 35. The net torque experienced by the machine is the sum of the waveforms 34 and 35 and this waveform (not shown) exhibits a ripple which can produce undesirable vibrations in a motor. For example when the motor is of the kind which drives directly a gramophone turntable, torque ripple is particularly undesirable in direct drive motors since the vibrations caused by the torque ripple can produce corresponding spurious signals in a pickup head of the gramophone with which the motor is associated. In order to obviate the torque ripple it is necessary to produce for each phase a torque characteristic as shown by the triangular waveforms 36 and 37 in FIGS. 6a and 6b respectively. The triangular waveform 36 can be produced by applying to the stator producing the waveform a modified voltage waveform 38 which has dips in it as shown in FIG. 6c. If the other phase of the motor is fed also with a waveform similar to the waveform 38 in FIG. 6c but phase shifted by 90° then the triangular torque characteristic 37 as shown in FIG. 6b will be produced. It will be appreciated that when the waveforms 36 and 37 are added together a net torque characteristic will result in which little or no ripple obtains.

With this arrangement a motor may be produced wherein vibration due to torque ripple is minimised.

It will be clear that the waveforms fed to the windings may be tailored by means of an electronic circuit to the triangular shape shown in FIG. 6c or they may be produced by means of a circuit shown in FIG. 7 which includes a Hall device 39.

In the circuit of FIG. 7, conduction of the Hall effect device is varied in accordance with the magnetic field to which it is exposed and if the Hall effect device is arranged in the field of the rotor of the motor a torque characteristic might normally be produced as shown by the waveforms 34 and 35 one for each phase of the machine profiling the edge of the rotor magnet so that the field strength experienced by the Hall effect device 39 is modified accordingly a field energising waveform may be produced corresponding to the waveforms 38 shown in FIG. 6c. Although the magnets of the rotor may themselves be profiled, it may alternatively be arranged that separate magnets for the purpose of operating the Hall effect device are provided which are suitably profiled to provide the required field.

In FIG. 7, the Hall effect device is arranged to feed the stator coils 40 via a circuit comprising transistors 41, 42, 43, 44 and 45, diodes 46, 47 and 48 and resistors 49 and 50. It can be seen from the circuit that the transistors 43 and 44 are arranged to operate in push-pull in dependence upon the sense of the magnetic field to which the Hall effect device 39 is exposed, the magnetic field being tailored by suitable profiling of the rotor magnets to produce a waveform 6 as just before described.

Alternatively, a circuit may be provided as shown in FIG. 8 wherein a Hall effect device 51 is connected between transistors 52 and 53 which feed stator coils 54 and 55, one for each phase, current for the Hall effect device being fed through resistors 56 and 57. It will be appreciated that as the rotor rotates to subject the Hall effect device to a varying magnetic field, the transistors 51 and 52 will conduct alternately to provide the switching currents required for the stator coils 54 and 55. The magnetic field which controls the conduction of the Hall effect device 51 will be adjusted by suitable selection of the magnets or profiling of the magnets, so as to produce a waveform which corresponds to the waveform 6 as described with reference to FIG. 7.

It should be appreciated that the triangular waveforms are chosen to produce a stator field which reacts with the generally linear constant flux level rotor field to produce a uniform ripple free torque characteristic.

It will therefore be apparent that with rotor magnets having non standard magnetic characteristics which may be produced by profiling, the stator may need to be energised with a waveform of some shape other than the triangular waveform shown to produce the desired ripple free torque characteristic, and as hereinbefore explained for two phase machines, sinusoidal rotor flux and stator current functions may be chosen for one phase, the rotor flux and stator current for the other phase being varied in accordance with a cosine function.

What we claim is:

1. A motor arrangement comprising a rotor having an even number of permanent magnet rotor poles arranged on the circumference of a circle centered at the motor shaft, a stator having at least one air cored stator winding per phase wherein the number of stator windings per phase is less than the number of rotor pole pairs, and commutator means for controlling current to be fed to said stator windings so that said stator windings react with the rotor poles to produce rotation of the rotor so that the sum, for all phases, of the product of magnetic flux and current for each phase at any angular position of the motor shaft is substantially constant thereby to provide substantially constant torque at the motor shaft.

2. A motor arrangement as claimed in claim 1, wherein said stator comprises a two phase stator winding and said rotor includes means for providing a sinusoidal magnetic flux gradient from pole to pole, said commutator means providing current waveforms for the two stator winding phases having sine and cosine characteristics respectively, the arrangement being such that the current waveforms complete one-half cycle consequent upon rotation of the rotor, one rotor pole pitch.

3. A motor arrangement as claimed in claim 1, wherein said rotor comprises a circular gramophone turntable, means for attaching said even number of permanent magnet rotor poles to said turntable at the circumference of a circle which is concentric with the circumference of the said turntable, and means for positioning said stator relative to said turntable to define a cylindrical air gap between said stator windings and said rotor poles.

4. A motor arrangement as claimed in claim 1, wherein stator windings are angularly spaced relative to the rotor poles so as to define a two phase motor having one winding per phase.

5. A motor arrangement as claimed in claim 1, wherein the stator windings are angularly spaced relative to the rotor poles so as to define a two phase motor having two windings per phase.

6. A motor arrangement as claimed in claim 5, wherein the stator windings are angularly spaced relative to the rotor poles so as to define a two phase motor having two windings per phase arranged diametrically in opposition whereby radial forces are substantially balanced.

7. A motor arrangement as claimed in claim 3, wherein the rotor poles are defined in a plastics permanent magnet material carried on a rim part of the turntable and formed to define a band secured to the inside surface of the rim.

8. A motor arrangement as claimed in claim 7 wherein a further rim of magnetic material is provided on the turntable the two rims being concentric, the air cored stator windings being arranged to project into the annular space between the two rims.

9. A motor arrangement as claimed in claim 3, wherein the turntable is journalled in a hydrodynamic bearing.

10. A motor arrangement as claimed in claim 1, wherein the commutator comprises Hall effect devices.

11. A motor arrangement as claimed in claim 10, wherein the Hall effect devices are arranged to be switched by flux emanating from the poles of the rotor.

12. A motor arrangement as claimed in claim 1, wherein the commutator means comprises an opto electrical arrangement including an optically graded filter disc connected to be rotatable with the turntable and arranged to interrupt light normally incident on a photo detector or photo detectors whereby the photo detector or photo detectors provide a signal utilised for commutation and controlling current fed to the two phases of a two phase machine in accordance with a sine and cosine function respectively.

13. A motor arrangement as claimed in claim 1 including a speed control system comprising a tacho generator producing a signal the frequency of which is dependent upon the frequency of rotation of the motor and a standard frequency signal, and a comparator in which the two signals are compared thereby to provide an error signal in dependence upon which the speed of the motor is controlled.

* * * * *